United States Patent
Ishikawa et al.

(10) Patent No.: US 6,874,870 B2
(45) Date of Patent: Apr. 5, 2005

(54) INKJET RECORDING METHOD

(75) Inventors: Wataru Ishikawa, Hachioji (JP); Kazuo Asano, Hino (JP)

(73) Assignee: Konica Technosearch Corp., Tokyo (JP)

(*) Notice: Subject to any disclaimer, the term of this patent is extended or adjusted under 35 U.S.C. 154(b) by 113 days.

(21) Appl. No.: 10/454,093

(22) Filed: Jun. 3, 2003

(65) Prior Publication Data

US 2003/0231226 A1 Dec. 18, 2003

(30) Foreign Application Priority Data

Jun. 7, 2002 (JP) .......................................... 2002-167077

(51) Int. Cl.$^7$ ................................................. B41J 2/16
(52) U.S. Cl. .......................................... 347/68; 347/69
(58) Field of Search ............................. 347/68, 69, 70, 347/71, 72, 40, 12, 95, 100

(56) References Cited

U.S. PATENT DOCUMENTS

| | | | |
|---|---|---|---|
| 4,228,438 A | 10/1980 | Vazirani | |
| 4,391,369 A | 7/1983 | Stahl | |
| 4,484,948 A | 11/1984 | Merritt | |
| 6,513,916 B2 * | 2/2003 | Isono et al. | 347/68 |
| 6,779,860 B1 * | 8/2004 | Hara et al. | 347/9 |

FOREIGN PATENT DOCUMENTS

| | | |
|---|---|---|
| JP | 56-32674 | 4/1981 |
| JP | 56-93776 | 7/1981 |
| JP | 5-186725 | 7/1993 |

* cited by examiner

*Primary Examiner*—Lamson Nguyen
(74) *Attorney, Agent, or Firm*—Cohen, Pontani, Lieberman & Pavane

(57) ABSTRACT

An inkjet recording method having a step of ejecting an ink containing at least photo-polymerizing compound and a colorant from a nozzle of a recording head, which has a piezoelectric member, to form an image on a recording member. The inkjet recording method utilizes a piezoelectric function of the piezoelectric member, a diameter of the nozzle (R) is from 20 to 50 μm, and a length of the piezoelectric member in an ink ejecting direction (L) is from 2.0 to 5.0 mm.

14 Claims, 2 Drawing Sheets

INKJET RECORDING METHOD

BACKGROUND OF THE INVENTION

The present invention relates to an inkjet recording method utilizing ink suitable for recording on every kind of medium including a medium having no ink absorbing property.

PRIOR ART

As an inkjet recording ink composition, a water-soluble liquid ink composition has been commonly utilized. Further, a hot-melt type inkjet recording method, in which a hot-melt type ink composition comprised of such as a wax as a raw material which is a solid at ordinary temperatures is utilized, being liquefied by such as heating, being ejected by application of some energy, and is cooled and solidified while adhering onto a recording medium to form recording dots, has been also proposed. Ink of this method causes no smudge in handling since it is in a solid state at ordinary temperatures, in addition, causes no clogging of a nozzle since it is possible to minimize a vaporizing amount of ink at the time of fusing. Further, it is advantageous in that there causes no "bleeding" because of immediate solidification after adhesion and that various kinds of paper such as a Japanese paper, a drawing paper, a post card and a plastic sheet can be utilized without any pre-treatment. Ink compositions, which can provide excellent printing quality regardless of a kind of paper quality, are described in U.S. Pat. Nos. 4,391,369 and 4,484,948.

Further, an ultraviolet ray curable resin type ink composition having an excellent adhesion property on a metal surface is disclosed in JP-A No. 56-93776 (hereinafter, JP-A refers to Japanese Patent Publication Open to Public Inspection); in addition, there are disclosed ink utilizing epoxy modified acrylic resin and urethane modified acrylic resin as binders and a pigment having a particle size of not more than 5 μm as a colorant component, as an inkjet recording ink being curable by ultraviolet ray irradiation, as disclosed in U.S. Pat. No. 4,228,438, ink utilizing cationic polymerizing epoxy resin as a binder as disclosed in JP-A No. 58-32674, and ink utilizing a water-soluble or water-insoluble dye as described in JP-A No. 5-186725, which are made to be easily printed on plain paper and recycled paper.

As described above, an inkjet recording method capable of high precision printing as high as photographic image quality on various kinds of recording media such as a plastic sheet, without utilizing such as exclusive inkjet paper, has been desired.

In case of utilizing water-based ink in printing, it is difficult to print on recording members having no ink absorbing property, and a large size ink drying apparatus is required even when exclusive paper is utilized. Further, the application purpose is limited because high precision printing is difficult due to a problem of bleeding and limited resolution.

Hot-melt type ink utilizing a wax is capable of printing even on a recording member having no ink absorbing property, as well as of high-speed printing, however, an anti-abrasion property is very poor to hardly obtain high reliability after printing and smoothness is also poor. Further, in hot-melt type ink, it is difficult to eject stably as small amount of a liquid drop as less than 10 pl.

On the other hand, an inkjet recording method utilizing an organic pigment as a colorant, since being provided with many advantages particularly in respect to weather resistance compared to an inkjet recording method utilizing dyes, has been expected to be applied such as not only to OA equipment, general home use printers, facsimiles and office printers, but also to indoor and outdoor posters, large format signboards, ornament for automobiles, glass, elevators, walls and buildings, as well as to printing on cloth. A recording method, in which a recording liquid is cured by light such as ultraviolet rays, is able to print on a recording member having no ink absorbing property. However, in an inkjet recording method in which a recording liquid utilizes a pigment, and specifically contains basically no water nor organic solvents and being cured by light such as ultraviolet rays, there is no precedent for high precision printing.

For the conventional inkjet ink containing water as the main composition, it is possible to design the characteristics of the ink with low viscosity and high surface tension for improving stability of ink ejection, and it is also possible to design the inkjet head freely to some extent for ejecting the ink.

However in the case of ejecting the ink containing the ultraviolet ray curable ink, the ink tends to have high viscosity and low surface tension compared to the conventional water soluble ink due to the characteristic of light curable compound of the main component, and further the viscoelasticity of the ink is largely different from that of water soluble ink, therefore, it is difficult to eject the light curable ink stably by using the inkjet head used for the water soluble ink as it is. Especially, in the case of ejecting small drops of ink, a stable printing will be hardly possible.

THE PROBLEMS TO BE SOLVED

The invention has been made to solve all of the above-described problems, and the object is to provide an inkjet recording method without ink-head clogging and bleeding of printed characters, having an excellent image stability (such as an anti-abrasion property) after printing, as well as being capable of high precision printing stably on every recording material.

SUMMARY OF THE INVENTION

The above-described object of the invention is achieved by the following constitutions.

(1) An inkjet recording method in which ink containing at least a photo-polymerizing compound and a colorant is ejected from a nozzle of a recording head to form an image on a recording member, wherein an inkjet method is a method to utilize a piezoelectric function of a piezoelectric member, a diameter of an inkjet nozzle (R) being from 20 to 50 μm, and a length of the piezoelectric member in a ink ejecting direction (L) is from 2.0 to 5.0 mm.

(2) The inkjet recording method described in item (1), wherein a ratio of a diameter of an inkjet nozzle (R) to a length of a piezoelectric member in an inkjet ejecting direction (L) is 5<R/L<20, and more preferably 7<R/L<20.

(3) The inkjet recording method described in item (1) or (2), wherein an ejection amount per 1 dot is from 20 to 2 pl (pico-liter).

(4) The inkjet recording method described in item (1), (2) or (3), wherein a dot diameter formed on a recording member is from 50 to 200 μm.

(5) The inkjet recording method described in any one of items (1) to (4), wherein ink, which is a liquid having a viscosity of from 10 to 500 mPa·s at 30° C., is heated at from 40 to 150° C. by a heating means and is ejected from a nozzle of a recording head.

(6) The inkjet recording method described in any one of items (1) to (5), wherein ink dose not substantially contain water or an organic solvent.

(7) The inkjet recording method described in any one of items (1) to (6), wherein a recording member has no ink-absorbing property.

(8) The inkjet recording method described in any one of items (1) to (7), wherein a colorant in ink is a pigment and a mean dispersion particle diameter thereof is not more than 200 nm as well as an addition amount thereof is from 0.5 to 30 weight %.

(9) The inkjet recording method described in any one of items (1) to (8), wherein ultraviolet rays are irradiated after image formation on a recording member.

DETAILED DESCRIPTION OF THE PREFERRED EMBODIMENT

The invention will be detailed below.

Figure 1:
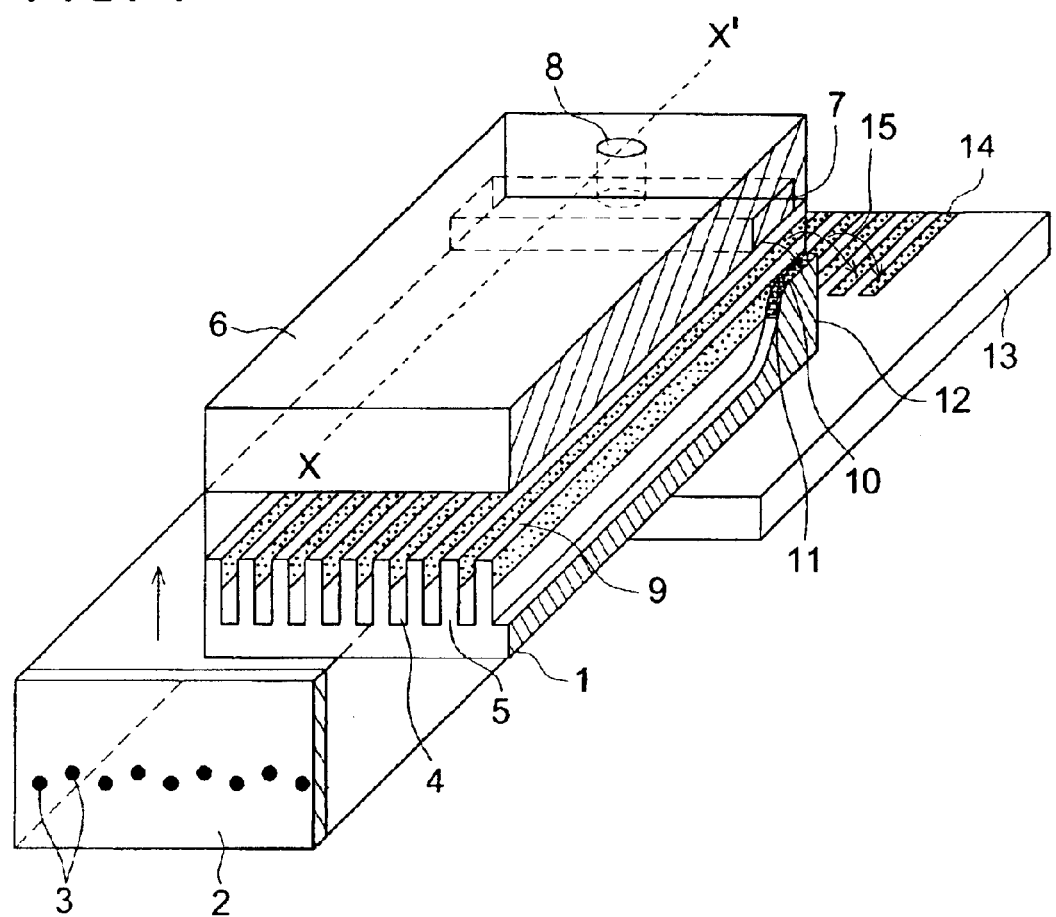
FIG. 1 is a perspective view drawing showing a constitution of a recording head in an example of an inkjet recording apparatus utilized in the invention.

Firstly, the invention will be explained in reference to drawings. FIG. 1 is a perspective view drawing showing a constitution of an inkjet head of a shear-mode type inkjet recording apparatus utilized in the invention. In the drawing, 1 is a piezoelectric ceramic board, 2 is a nozzle plate, 3 is a nozzle, 4 is a groove (an ink flow passage), 5 is a side wall, 6 is a cover plate, 7 is an ink supply portion (hereinafter, referred to as a manifold), and 8 is an ink introducing inlet.

In piezoelectric ceramic board 1, a plural number of grooves 4 are formed, by being cut by use of such as a diamond blade, all being in a same shape and parallel to each other, and side walls 5 which form side planes of grooves 4 are polarized in the upward direction. The depth of groove 4 becomes shallow gradually as it approaches one end plane 12 of a piezoelectric ceramic board to be made into shallow groove 10 in the vicinity of end plane 12. Inside of groove 4, metallic electrode 9 is provided at an upper half of both side planes by means of such as sputtering. Further, inside of shallow groove 10, a metallic electrode 11 is provided on the side plane and on the bottom plane by means of such as sputtering, and metallic electrode 9 and metallic electrode 11 are connected.

Cover plate 6 is made of such as a ceramic material or a resin material, and ink introducing inlet 8 and manifold 7 are formed by such as grinding or cutting manufacturing. Further, the plane on which groove 4 of piezoelectric ceramic board 1 is provided and the plane on which manifold 7 of cover plate 6 is provided are adhered to form an ink passage by covering the upper plane of groove 4 with cover plate 6.

Nozzle plate 2, provided with nozzle 3 at a position corresponding to a position of each ink passage 4, is adhered to piezoelectric ceramic board 1 and the end plane of cover plate 6. A nozzle plate is comprised of plastics such as polyalkylene terephthalate including PET, polyimide, polyether imide, polyether ketone, polyether sulfon, polycarbonate and cellulose acetate.

Board 13, provided with pattern 14 of an electric conductive layer at a position corresponding to a position of each ink passage 4 is adhered to the plane opposite to the manufacturing side of groove 4 of piezoelectric ceramic board 1 by such as an epoxy type adhesive, and pattern 14 of an electric conductive layer and metallic electrode 11 of shallow groove 10 are connected by leading wire 15 of a wire-bonding.

Figure 2:
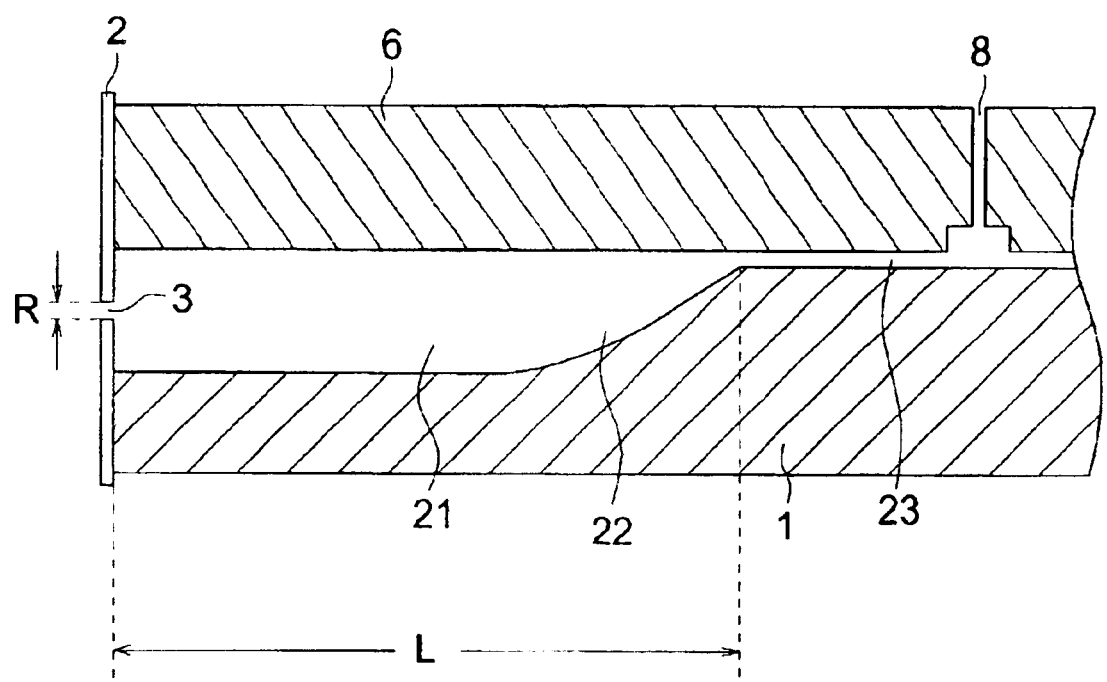
FIG. 2 is a cross-sectional drawing being cut vertically along dashed line X–X' beside an ink introducing inlet of FIG. 1.

FIG. 2 is a cross-sectional drawing being cut perpendicularly along dashed line X–X' beside an ink introducing inlet of FIG. 1, and an inkjet nozzle diameter (R) of the invention represents 3 and a length in an ink ejecting direction of piezoelectric member (L) represents a distance from the place where groove starts to become deeper to nozzle plate 2 as shown in FIG. 2.

Next, characteristics of the invention will be explained successively.

An inkjet nozzle diameter of the invention (R) indicates a diameter when a nozzle hole ejecting ink is a circle and a short diameter when it is an ellipse. R is from 20 to 50 $\mu$m and preferably from 20 to 40 $\mu$m. Nozzle clogging becomes worse when it is less than 20 $\mu$m and high precision printing becomes difficult when it is over 50 $\mu$m.

A length in an ink ejecting direction of piezoelectric member (L) is preferably from 2.0 to 5.0 mm. Ejection becomes difficult when it is less than 2.0 mm, and stable ejection becomes difficult when it is over 5.0 mm.

A ratio of the length in an ink ejecting direction of piezoelectric member (L) to the inkjet nozzle diameter (R) is preferably 5<R/L<20. It is further preferably 7<R/L<20. Nozzle clogging tends to occur when the ratio is not more than 5, and an ejection property tends to be poor when it is not less than 20.

An ejection amount per 1 dot is preferably from 20 to 2 pl. It is more preferably not more than 10 pl and furthermore preferably from 7 to 4 pl. High precision printing becomes difficult when it is over 20 pl, and density of an image formed becomes low when it is less than 2 pl.

A dot diameter formed on a recording member is preferably from 50 to 200 $\mu$m. It is more preferably from 50 to 150 $\mu$m and furthermore preferably from 55 to 100 $\mu$m. Density of an image formed becomes low when it is less than 50 $\mu$m and high precision printing is difficult when it is over 200 $\mu$m.

Ink of the invention is preferably contains basically no water and no organic solvent. Containing basically no water and no organic solvent means that a content of water and an organic solvent is less than 1 weight %. Further, organic solvents being referred to herein, indicate the following:

A polyhydric alcohol series having a high boiling point and a low volatile property such as glycerin, ethyleneglycol, diethyleneglycol, triethyleneglycol, propyreneglycol, dipropyreneglycol, hexyleneglycol, polyethyleneglycol and polypropyreneglycol. Further, mono-etherified compounds, dietherified compounds and esterified compounds thereof, for example, such as ethyleneglycol monomethylether, ethyleneglycol monoethylether, ethyleneglycol monobutylether, diethyleneglycol monomethylether, diethyleneglycol monoethylether and diethyleneglycol monobutylether. A cellosolve series such as methyl cellosolve and ethyl cellosolve; a carbitol series such as methyl carbitol and ethyl carbitol; a morpholine series such as morpholine and N-ethylmorpholine; a pyrrolidone series such as N-methyl-2-pyrrolidone. A highly volatile monohydric alcohol series such as ethanol, propanol, i-propanol and butanol. Ethyl acetate, butyl acetate, methyl benzoate, methyl ethyl ketone, methyl isobutyl ketone, cyclohexanone, N,N-dimethyl formamide, an ethyleneglycol ether series, an ethyleneglycol acetate series, a propyleneglycol acetate series, propyleneglycol ether series, etc.

In the invention, as driving power for ink ejection of an inkjet printer, preferable is a method utilizing piezoelectric function of a piezoelectric member which is applicable to a wide range of ink and capable of high speed ejection. It is concretely, as described, for example, in Japanese Patent Publication No. 4-48622, an inkjet head method in which the inside of a fine groove formed on a piezoelectric substrate is provided with an electrode film, further being covered with an insulating film to be made as an ink passage.

As an irradiation ray source, various kinds of ray sources of such as ultraviolet rays, electron rays, X rays, visible rays and infrared rays can be utilized, however, ultraviolet rays are preferable taking a curing property and a cost of a ray source in consideration. As an ultraviolet ray source, such as a mercury lamp, a metal halide lamp, an excimer lamp, an ultraviolet laser and an LED can be utilized.

A basic irradiation method is disclosed in JP-A No. 60-132767. According to this, a light source is provided on both sides of a head unite and a head and a light source are scanned in a shuttle mode. Irradiation is performed at a certain time interval after ink bullet landing. Further, curing is completed by another light source without driving. In WO99/54416, a method utilizing an optical fiber as an irradiation method, and a method in which a collimated light source is directed to a mirror provided on the side plane of a head unite and ultraviolet light is irradiated onto a recording portion, are disclosed. In a recording method of the invention, these irradiation methods can be utilized. Concretely, a metal halide lamp tube and UV lamp tube of belt-formed are preferable. A ray source can be comprised of a low cost constitution by being basically fixed on a recording apparatus and eliminating a driving portion.

Irradiation is preferably performed at every printing of each color, that is, in any irradiation method, it is a preferable embodiment to prepare two kinds of ray sources and to complete curing by the second ray source. This contributes to wettability of a landed ink bullet of the second color and an adhesive property between ink as well as to constituting a ray source at a low price.

Herein, the first ray source and the second ray source preferably differ in irradiation wavelength or irradiation illuminance. The first irradiation energy is set to be smaller than the second irradiation energy, that is, the first irradiation energy is set to be from 1 to 20% of the total irradiation energy, preferably from 1 to 10% and more preferably from 1 to 5%. By irradiation with different illuminances, a molecular weight distribution after curing is made to be preferable. That is, when irradiation with a high illuminance at one time is performed, a polymerization ratio can be increased, however, a molecular weigh of a polymerized polymer becomes small to give insufficient strength.

Further, it is possible to cure the surface layer with the first irradiation to depress bleeding of ink and to cure ink in the vicinity of a recording medium, where irradiation ray is hard to reach, with the second irradiation, resulting in improvement of an adhesion property, by setting a wavelength of the first irradiation longer than that of the second irradiation. A wavelength of the second irradiation is preferably longer also to accelerate to cure the inside of ink.

A recording method of the invention is characterized in that the above-described ink is utilized, and while ink is heated at a certain temperature, radiation is irradiated at from 0.01 to 0.5 seconds, preferably from 0.01 to 0.3 seconds and further preferably from 0.01 to 0.15 seconds after ink bullet landing. It is possible to prevent bleeding of landed ink before being cured by controlling the time after bullet landing to irradiation to be a very short time. Further, since irradiation is possible before penetration of ink into a deep portion where light source cannot reach even with a porous recording medium, residual of a non-reacted monomer can be depressed to decrease odor. Herein, a large synergistic effect can be achieved by utilizing ink of the invention, that is, ink having a viscosity of from 10 to 500 mPa·s at 30° C. A large effect can be obtained, specifically by utilizing ink having a viscosity of from 35 to 500 mPa·s at 30° C.

It is possible to maintain a dot diameter of landed ink constant to improve image quality even on various recording media having different surface wettability, by applying such a recording method of the invention. In case of forming a colored image, it is preferable to accumulate colors starting with a color of lower lightness in order. When a color of low lightness is accumulated upper, irradiation is hard to reach underlying ink resulting in being liable to cause inhibition of curing sensitivity, increase of a residual monomer, generation of odor, and deterioration of adhesion.

Further, irradiation can be performed after ejection of all colors, however, preferably performed for each color in respect to acceleration of curing.

Further, in a unit comprised of a plural number of color heads, portions between each color head are preferably made to be basically transparent to irradiation rays. Concretely, the portions between the heads are comprised of a member transparent to irradiation rays or have a constitution without any member. In a constitution of the invention, by adopting such a simple constitution, rapid irradiation immediately after ink bullet landing of each color is possible, and it is specifically preferable that bleeding of secondary colors can be prevented as well as differences between dot bleeding of going and returning in a both ways drawing can be prevented (differences between colors of going and returning can be prevented).

In a recording method of the invention, it is preferable to eject the above-described ink by being heated at from 40 to 150° C. to lower a viscosity of ink, in respect to ejection stability. It is furthermore preferable, at from 40 to 100° C. Ejection becomes difficult at lower than 40° C. and at higher than 150° C. Irradiation ray curable ink is generally has a large variation width of viscosity due to temperature variation, because it generally has a higher viscosity than water-based ink. It is important to maintain ink temperature constant as much as possible, since viscosity variation affects directly to a liquid droplet size and liquid droplet ejection speed significantly resulting in deterioration of image quality. A control width of ink temperature is a set temperature ±5° C., preferably a set temperature ±2° C. and more preferably a set temperature ±1° C. A recording apparatus is equipped with a means to stabilize ink temperature, and the portion where a constant temperature is required includes the whole piping system and members, from an ink tank to an ejection plane of a nozzle.

It is preferable to provide plural thermal sensors at each piping portion and to perform thermal control corresponding to an ink flow volume and environmental temperature, to control the temperature. Further, a head unit being heated is preferably thermally shielded or insulated not as to suffer from effects of temperatures of an apparatus main body or an outer atmosphere. It is preferable to provide thermal insulation against other portions in addition to make a heat capacity of the whole heating unit minimal, to shorten the printer warm-up time required for heating as well as to decrease a thermal energy loss.

A recording body having no ink-absorbing property or a little ink-absorbing property (or a non-ink-absorbing recording member) is a recording body comprised of a material having no ink-absorbing property or a little ink-absorbing property (or a non-ink-absorbing material), or a recording body provided with a surface layer comprised of a material having no ink-absorbing property or a little ink-absorbing property (or a non-ink-absorbing material), and materials having no ink-absorbing property or a little ink-absorbing property (or a non-ink-absorbing material) are, for example, various kinds of plastics and metals.

Ink according to the invention is a liquid having a viscosity at 30° C. of from 10 to 500 mPa·s. It is preferably from 40 to 500 mPa·s. Image quality is deteriorated with bleeding when it is less than 10 mPa·s, and smoothness of images is lost when it is over 500 mPa·s. Further, the ink is preferably a liquid having a viscosity at 60° C. of from 3 to 30 mPa·s and more preferably from 3 to 20 mPa·s. Troubles are caused in high-speed ejection when it is less than 3 mPa·s, and an ejection property is deteriorated when it is over 30 mPa·s.

Next, photo-polymerizing compounds and photo-polymerizing initiators utilized in ink of the invention will be described.

As a photo-polymerizing compound, radical polymerizing compounds, for example, photo-curable materials utilizing photo-polymerizing compositions described in JP-A No. 7-159983, JP-B No. 7-31399 (hereinafter, JP-B refers to Japanese Patent Publication) and JP-A 8-224982, and photo-curable resin of a cationic polymerization type are well known, and recently photo-curable resin of a cationic polymerization type which is sensitized for a wavelength range longer than visible light is also disclosed, for example, in such as JP-A Nos. 6-43633 and 8-324137.

A radical polymerizing compound is a compound having an ethylenically unsaturated bond being capable of radical polymerization, and may be any compounds having at least one ethylenically unsaturated bond being capable of radical polymerization in a molecule, including compounds having chemical forms of such as a monomer, an oligomer and a polymer. Only one kind of radical polymerizing compounds may be utilized, or combinations of not less than two kinds thereof may be utilized at arbitrary mixing ratio to improve aimed characteristics.

Examples of a compound including a radical polymerizable ethylenically unsaturated bond include unsaturated carboxylic acid such as acrylic acid, methacrylic acid, itaconic acid, crotonic acid, isocrotonic acid and maleic acid, and salts, esters, urethanes and anhydrides thereof, acrylonitrile, styrene, in addition, radical polymerizing compounds such as various kinds of unsaturated polyesters, unsaturated polyethers, unsaturated polyamides and unsaturated urethanes. Concretely, acrylic derivatives such as 2-ethylhexyl acrylate, 2-hydroxy ethylacrylate, butoxy ethylacrylate, carbitol acrylate, cyclohexyl acrylate, tetrahydrofurfuryl acrylate, benzyl acrylate, bis(4-acryloxy polyethoxyphenyl) propane, neopentylglycol diacrylate, 1,6-hexanediol diacrylate, ethyleneglycol diacrylate, diethyleneglycol diacrylate, triethyleneglycol diacrylate, tetraethyleneglycol diacrylate, polyethyleneglycol diacrylate, polypropyleneglycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide and epoxy acrylate; methacrylic derivatives such as methyl methacrylate butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethyleneglycol dimethacrylate, triethyleneglycol dimethacrylate, polyethyleneglycol dimethacrylate, polypropyleneglycol dimethacrylate, trimethylolethane methacrylate, trimethylolpropane trimetacrylate and 2,2-bis(4-methacryloxypolyethoxyphenyl)propane; as well as allyl compounds such as allylgrycidyl ether, diallylphthalate and triallyl trimellitate; are listed, and further concretely, radical polymerizing or cross-liking monomers, oligomers and polymers, being available on the market or well known in the art, described in such as "Handbook of Cross-linking Agents" edited by Shinzo Yamashita (1981, published by Taisei-Sha), "Handbook of UV·EB Curing (Raw Materials)" edited by Seiji Kato (1985, published by Kobunshi Kankokai), "Applications and Market of UV–EB Curing Technology" edited by RadTec Japan, p. 79 (1989, published by CMC), and "Handbook of Polyester Resin" edited by Eiichi Takiyama (1988, published by Nikkan Kogyo Shinbunsha) can be utilized. An addition amount of the above-described radical polymerizing compounds is preferably from 1 to 97 weight % and more preferably from 30 to 95 weight %.

A radical polymerization initiator includes triazine derivatives described in such as JP-B Nos. 59-1281 and 61-9621, and JP-A No. 60-60104, organic peroxides described in such as JP-A Nos. 59-1504 and 61-243807, diazonium compounds described in such as JP-B Nos. 43-23684, 44-6413 and 47-1604, and U.S. Pat. No. 3,567,453, organic azide compounds described in such as U.S. Pat. Nos. 2,848,328, 2,852,379 and 2,940,853, o-quinonediazide series described in such as JP-B Nos. 36-22062, 37-13109, 38-18015 and 45-610, various kinds of onium compounds described in such as in JP-B No. 55-39162, JP-A No. 59-14023 and "Macromolecules" vol. 10, p. 1307 (1977), azo compounds described in JP-A No. 59-142205, metal allene complexes described in such as JP-A No. 1-54440, European Patent Nos. 109,851 and 126,712, and J. Imag. Sci. vol. 30, p. 174 (1986), (oxo)sulfonium organoboride complexes described in JP-A Nos. 5-213861 and 5-255347, titanocene series described in JP-A No. 61-151197, transition metal complexes containing a transition metal such as ruthenium described in "Coordination Chemistry Review" vol. 84, pp. 85 to 277 (1988) and JP-A No. 2-182701, 2,4,5-triarylimidazol dimer described in JP-A No. 3-209477, carbon tetrabromide, and organohalogen compounds described in JP-A No. 59-107344. These polymerization initiators are preferably contained in a range of from 0.01 to 10 weight % based on 100 weight % of a compound having a radical polymerizable ethylenically unsaturated bond.

Cation polymerizing photo-curable resin can include a UV-curable prepolymer or monomer of an epoxy type in a type which can be polymerized by cation polymerization (mainly being an epoxy type), and the prepolymer or monomer contains not less than two epoxy groups in a molecule. Such prepolymers include, for example, such as aliphatic polyepoxide series, polyglycidylester series of polybasic acid, polyglycidylether series of polyhydric alcohol, polyglycidylether series of polyoxyalkyleneglycol, polyglycidylether series of aromatic polyol, hydrogen adduct series of polyglycidylether series of aromatic polyol, urethane polyepoxy compound series, and epoxyfied polybutadiene series. These prepolymers can be utilized alone or by mixing not less than two kinds.

A cation polymerizing compounds contained in a cation polymerizing composition can include, in addition, the following (1) styrene derivatives, (2) vinylnaphthalene derivatives, (3) vinylether series and (4) N-vinyl compound series.

(1) Stylene derivatives:

styrene, p-methyl styrene, p-methoxy styrene, β-methyl styrene, p-methyl-β-methyl styrene, α-methyl styrene, p-methoxy-β-methyl styrene, etc.

(2) Vinylnaphthalene derivatives:

for example, 1-vinylnaphthalene, α-methyl-1-vinylnaphthalene, β-methyl-1-vinylnaphthalene, 4-methyl-1-vinylnaphthalene, 4-methoxy-1-vinylnaphthalene, etc.

(3) Vinylether series:

i-butyl vinylether, ethyl vinylether, phenyl vinylether, p-methylphenyl vinylether, p-methoxyphenyl vinylether, α-methylphenyl vinylether, β-methylisobutyl vinylether, β-chloroisobutyl vinylether, etc.

(4) N-vinyl compound series:

N-vinylcarbazol, N-vinylpyrrolidone, N-vinylindole, N-vinylpyrrol, N-vinylphenothiazine, N-vinylacetoanilide, N-vinylethylacetoamide, N-vinylsuccinimide, N-vinylphthalimide, N-vinylcaprolactam, N-vinylimidazole, etc.

A content of the above-described cation polymerizing compound in a cation polymerizing composition is preferably from 1 to 97 weight % and more preferably from 30 to 95 weight %.

An initiator of cation polymerizing photo-curable resin can include an aromatic onium salt. The aromatic onium salt includes, for example, salts of elements in Va group of the periodic table for example, a phosphonium salt (such as triphenacyl phosphonium hexafluorophosphate), salts of elements in VIa group, for example, a sulfonium salts (such as triphenylsulfonium tetrafluoroborate, triphenylsulfonium hexafluorophosphate, tris(4-thiomethoxyphenyl) hexafluorophosphate, sulfonium and triphenylsulfonium hexafluoroantimonate), and salts of elemnts in VIIa group, for example, an iodonium salt (such as diphenyliodonium chloride).

To utilize these aromatic onium salts as a cation polymerization initiator for polymerization of an epoxy compound is detailed in U.S. Pat. Nos. 4,058,401, 4,069,055, 4,101,513 and 4,161,478.

A preferable cation polymerization initiator includes sulfonium salts of elements in VIa group. Among them, triarylsulfonium hexafluoroantimonate is preferable in respect to a UV curing property and storage stability of a UV-curable composition. Further, well known photo-initiators described in "Photopolymer Handbook" (edited by The Technical Association of Photosensitive Polymers of Japan, published by Kogyo Chosakai, 1989), pp. 39 to 56, and compounds described in JP-A Nos. 64-13142 and 2-4804 can be arbitrarily utilized.

As additives to ink of the invention, other additives such as a reaction diluent, a filler, a fluidity aid, a thixotropic agent, a wetting agent, a defoaming agent and a plastisizer can be incorporated. Further, a light fastening agent, a UV-absorber, an anti-oxidant, a polymerization inhibitor, a stabilizer or a Si-contained compound such as a corrosion inhibitor, a wax, etc. may be added.

As a colorant in an ink composition of the invention, dyes and pigments well known conventionally can be utilized. A pigment is more preferable in the invention.

Water-soluble dyes include, for example, such as C. I. Direct Black-2, -4, -9, -11, -17, -19, -22, -32, -80, -151, -154, -168, -171 and -194; C. I. Direct Blue-1, -2, -6, -8, -22, -34, -70, -71, -76, -78, -86, -112, -142, -165, -199, -200, -201, -202, -203, -207, -218, -236 and -287; C. I. Direct Red-1, -2, -4, -8, -9, -11, -13, -15, -20, -28, -31, -33, -37, -39, -51, -62, -63, -73, -75, -80, -81, -83, -87, -90, -94, -95, -99, -101, -110 and -189; C. I. Direct Yellow-1, -2, -4, -8, -11, -12, -26, -27, -28, -33, -34, -41, -44, -48, -58, -86, -87, -88, -135, -142 and -144; C. I. Direct Black-1 and -2; Acid Black-1, -2, -7, -16, -24, -26, -28, -31, -48, -52, -63, -107, -112, -118, -119, -121, -156, -172, -194 and -208; C. I. Acid Blue-1, -7, -9, -15, -22, -23, -27, -29, -40, -43, -55, -59, -62, -78, -80, -81, -83, -90, -102, -104, -111, -185, -249 and -254; C. I. Acid Red-1, -4, -8, -13, -14, -15, -18, -21, -26, -35, -37, -110, -144, -180, -249 and -257; C. I. Acid Yellow-1, -3, -4, -7, -11, -12, -13, -14, -18, -19, -23, -25, -34, -38, -41, -42, -44, -53, -55, -61, -71, -76, -78, -79 and -122.

Oil-soluble dyes include an azo dye, a metal complex dye, a naphthol dye, an antraquinone dye, an indigo dye, a carbonium dye, a quinoimine dye, a cyanine dye, a quinoline dye, a nitro dye, a nitroso dye, a benzoquinone dye, a naphthoqinone dye, a naphthalimide dye, a perylene dye and phthalocyanine dye, however, are not limited thereto.

Dyes insoluble in water and pigments are not specifically limited, and include such as an organic pigment, an inorganc pigment, colored polymer particles, a water-insoluble dye, a dispersion dye and an oil-soluble dye. Black pigments include carbon black such as furnace black, lamp black, acetylene black and channel black, and Raven 7000, Raven 5750, Raven 5250, Raven 5000, ULTRA II, Raven 3500, Raven 2000, Raven 1500, Raven 1250, Raven 1200, Raven 1190, Raven 1170, Raven 1255, Raven 1080 and Raven 1060 (all above are manufactured by Columbia Carbon Co.), Regal 400, Regal 330R, Regal 660R, Mogul L, Black Pearls L, Monarch 700, Monarch 800, Monarch 880, Monarch 900, Monarch 1000, Monarch 1100, Monarch 1300 and Monarch 1400(all above are manufactured by Cabotte Co.), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (all above are manufactured by Degussa Co.), No. 25, No. 33, No. 40, No.47, No. 52, No. 900, No. 2300, MCF-88, MA600, MA7, MA8 and MA100 (all above are manufactured by Mitsubishi Chemical Corp.) can be utilized. Further, magnetic fine particles of such as magnetite and ferrite, and titanium black can be also utilized as a black pigment.

Cyan pigments include such as C. I. Pigment Blue-1, C. I. Pigment Blue-2, C. I. Pigment Blue-3, C. I. Pigment Blue-15, C. I. Pigment Blue-15:1, C. I. Pigment Blue-15:3, C. I. Pigment Blue-15:34, C. I. Pigment Blue-16, C. I. Pigment Blue-22 and C. I. Pigment Blue-60.

Magenta pigments include such as C. I. Pigment Red-S, C. I. Pigment Red-7, C. I. Pigment Red-12, C. I. Pigment Red-48, C. I. Pigment Red-48:1, C. I. Pigment Red-57, C. I. Pigment Red-112, C. I. Pigment Red-122, C. I. Pigment Red-123, C. I. Pigment Red-146, C. I. Pigment Red-168, C. I. Pigment Red-184 and C. I. Pigment Red-202.

Further, yellow pigments include such as C. I. Pigment Yellow-1, C. I. Pigment Yellow-2, C. I. Pigment Yellow-3, C. I. Pigment Yellow-12, C. I. Pigment Yellow-13, C. I. Pigment Yellow-14, C. I. Pigment Yellow-16, C. I. Pigment Yellow-17, C. I. Pigment Yellow-73, C. I. Pigment Yellow-83, C. I. Pigment Yellow-93, C. I. Pigment Yellow-95, C. I. Pigment Yellow-97, C. I. Pigment Yellow-98, C. I. Pigment Yellow-114, C. I. Pigment Yellow-128, C. I. Pigment Yellow-129, C. I. Pigment Yellow-151 and C. I. Pigment Yellow-154.

Other than the above-described pigments of black color and of three primary colors of cyan, magenta and yellow; special color pigments of such as red, green, blue, brown and white, metallic glossy pigments of such as golden color and silvery color, colorless extender pigments and plastic pigments can be also utilized. In addition, newly synthesized pigments can be also utilized other than the above-described pigments. Further, these pigments may have been subjected to a surface treatment. A surface treatment method includes, for example, such as a treatment by alcohol, acid, base and a coupling agent such as a silane compound, a polymer grafting treatment and a plasma treatment.

A colorant utilized in the invention preferably has a minimal content of organic and inorganic impurities. Since colorants generally available on the market contain significant amount of impurities, it is preferable to utilize the purified products thereof. In the invention, a colorlant in the above-described solid ink composition is utilized in a range of from 0.1 to 30 weight % and preferably of from 1 to 15 weight %.

In the invention, dispesed pigments are preferably utilized. A dispersant utilized to disperse a pigment, for example, can include surfactants such as a higher fatty acid salt, an alkyl sulfate, an alkyl ester sulfate, an alkyl sulfonate, a sulfosuccinate, a naphthalene sulfonate, an alkyl phosphate, a polyoxyalkylenealkylether phosphate, a polyoxyalkylenealkylphenyl ether, a polyoxyethylene polyoxypropyleneglycol, a glycerin ester, a sorbitan ester, polyoxyethylene fatty acid amide, amineoxide; and, block copolymers, random copolymers and salts thereof, comprised of not less than two kinds of monomers selected from styrene, a styrene derivative, a vinylnaphthalene derivetive, acrylic acid, an acrylic acid derivative, maleic acid, a maleic acid derivative, itaconic acid, an itaconic acid derivative, fumaric acid and a fumaric acid derivaive.

For dispersion of a pigment, various kinds of such as a ball mill, a sand mill, an attriter, a roll mill, an agitator, a Henschel mixer, a colloidal mill, an ultrasonic homogenizer, a pearl mill, a wet jet mill and a paint shaker can be utilized. Further, to eliminate coarse grains from a pigment dispersion by use of a centrifugal separator or a filter is preferable.

A mean particle diameter of a pigment dispersion utilized in ink of the invention is preferably not more than 200 nm and more preferably not more than 100 nm. The under limit is approximately 20 nm. An addition amount of a pigment dispersion utilized in ink of the invention is preferably in a range of generally from 0.5 to 30 weight % and more preferably in a range of from 1 to 20 weight %.

In ink of the invention, a water-soluble organic solvent can be added when necessary. A water-soluble organic solvent preferably utilized includes an alcohol series (such as methanol, ethanol, propanol, i-propanol, butanol, i-butanol, sec-butanol, t-butanol, pentanol, hexanol, cyclohexanol and benzyl alcohol), a polyhydric alcohol series (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thioglycol), a poly hydric alcohol ether series (such as ethyleneglycol monomethylether, ethyleneglycol monoethylether, ethyleneglycol monobutylether, diethyleneglycol monomethylether, diethyleneglycol monoethylether, diethyleneglycol monobutylether, propyleneglycol monomethylether, propyleneglycol monobutylether, ethyleneglycol monomethylether acetate, triethyleneglycol monomethylether, triethyleneglycol monoethylether, triethyleneglycol monobutylether, ethyleneglycol monophenylether and propyleneglycol monophenylether), an amine series (such as ethanol amine, diethanol amine, triethanol amine, N-methyldiethanol amine, N-ethyldiathanol amine, morpholine, N-ethyl morpholine, ethylene diamine, diethylene triamine, triethylene tetramne, tetraethylene pentamine, polyethylene imine, pentamethyldiethylene triamine and tetramethylpropylene diamine), an amide series (such as formamide, N,N-dimethyl formamide and N,N-dimethyl acetoamide), a heterocyclic ring series (such as 2-pyrrolidone, N-methyl-2-pyrrolidone, cyclohexyl pyrrolidone, 2-oxadoline and 1,3-dimethyl-2-imidazolidinone), a sulfoxide series (such as dimethyl sulfoxide), a sulfone series (such as sulforane), urea, acetonitrile and acetone.

Such as an antiseptic agent, an anti-mold agent and viscosity adjusting agent other than these may be contained in ink, when necessary.

Next, physical properties of ink will be explained.

A pH of ink of the invention is preferably from 4 to 10 and furthermore preferably from 5 to 9. Reasons for effects of the invention are not clear, however, it is considered that compatibility of a pigment and a photopolymerizing compound contributes to dispersion stability of a pigment.

In ink of the invention, a surface tension of ink is preferably in a range from 20 to 60 mN/m, taking the wettability against a recording material and a head nozzle member in consideration. It is more preferably set in a range from 25 to 50 mN/m. Ink is liable to overflow from a nozzle when a surface tension is not higher than 25 mN/m, and drying time becomes long when it is not lower than 60 mN/m.

A surfactant may be incorporated to adjust a surface tension if necessary. Surfactants preferably utilized in ink of the invention include, for example, anion surfactants such as a dialkyl sulfosuccinate series, an alkylnaphthalene sulfonate series and a fatty acid salt series; nonion surfactants such as a polyoxyethylene alkylether series, a polyoxyethylene alkylallylether series, an acetylene glycol series and a polyoxyehtylene polyoxypropylene block copolymer series; cation surfactants such as an alkylamine salt series and a tertiary ammonium salt series. Among these, anion surfactants and nonion surfactants are specifically preferable.

EXAMPLES

In what follows, the invention will be explained furthermore concretely in reference to examples, however the invention is not limited to these embodiments. Herein, "parts" in examples represents "weight parts", and "%" represents "weight %", unless otherwise described.

Example 1

(Preparation of Ink)

After the following ink composition was heated, at 60° C. or at 150° C. in case of solid ink, and mixed and stirred, the resulting liquid was filtered by a filter while being heated followed by being cooled to obtain an ink composition. Further, ink 2 was prepared by mixing without being heated.

"Ink 1"

| | |
|---|---|
| C. I. Pigment Blue 15: 3 | 5 parts |
| (mean particle diameter: 100 nm) | |
| Paraffin wax | 45 parts |
| (manufactured by Nippon Seiro Co., Ltd.) | |
| Behenic acid | 30 parts |
| (manufactured by Wako Junyaku Co., Ltd.) | |

-continued

| | |
|---|---|
| Oleic acid amide (manufactured by Kao Corp.: fatty acid amide ON) | 20 parts |

"Ink 2"

| | |
|---|---|
| C. I. Pigment Blue 15: 3 | 20 parts |
| Polymer dispersant (manufactured by Zeneca Co.: Solsperse Series) | 5 parts |
| Stearyl acrylate | 75 parts |

Herein, dispersion was performed, so as to make a mean particle diameter of each pigment particle in a range of from 0.2 to 0.3 µm, by use of a commonly known dispersion apparatus and by controlling dispersion conditions, followed by filtration through a filter while being heated to obtain a cyan pigment dispersion.

Ink 2 was prepared by utilizing the cyan pigment dispersion.

| | |
|---|---|
| Cyan pigment dispersion | 5 parts |
| Lauryl acrylate (mono-functional) as a photopolymerizing compound | 10 parts |
| Etyleneoxide-modified trimethirolpropane triacrylate (tri-functional) | 10 parts |
| Caprolactam-modified dipentaerythritol hexacrylate (hexa-functional) | 10 to 40 parts |
| Tetraethyleneglycol diacrylate (bi-functional) | 5 to 30 parts |

The addition amounts were adjusted so as to make viscosity of the values shown in the tables.

As polymerization initiators:

| | |
|---|---|
| Irgacure 184 (manufactured by Ciba Geigie Japan Co.) | 2.5 parts |
| Irgacure 907 (manufactured by Ciba Geigie Japan Co.) | 2.5 parts |
| The above-prepared colored ink was filtered through a filter having an absolute filtering precision of 2 µm to obtain ink 2. | |

"Ink 3"

| | |
|---|---|
| Cyan pigment dispersion | 5 parts |
| Lauryl acrylate as a photopolymerizing compound | 10 parts |
| Etyleneoxide-modified trimethirolpropane triacrylate | 10 parts |
| AT-600 (manufactured by Kyoei Chemicals Co., Ltd.) | 10 to 40 parts |
| Tetraethyleneglycol diacrylate | 5 to 30 parts |

The addition amounts were adjusted so as to make viscosity of the values shown in the tables.

As polymerization initiators:

| | |
|---|---|
| Irgacure 184 (described above) | 2.5 parts |
| Irgacure 907 (described above) | 2.5 parts |

"Ink 4"

| | |
|---|---|
| Cyan pigment dispersion (mean dispersion particle diameter: 100 nm) | 5 parts |
| 1,6-hexanediol diacrylate as a photopolymerizing compound | 15 parts |
| 2-phenoxyethyl acrylate | 20 parts |
| Polypropyleneglycol diacrylate | 10 to 20 parts |
| Octyl acrylate | 10 to 29 parts |

The addition amounts were adjusted so as to make a viscosity of 6 mPa·s.

As polymerization initiators:

| | |
|---|---|
| Irgacure 184 (described above) | 5 parts |
| 2-phenoxy ethanol | 1 part |

(Inkjet Image Recording)

Next, recording on a recording medium was performed by use of an inkjet recording apparatus comprising a constitution of FIGS. 1 and 2 provided with a piezo-type inkjet nozzle. An ink supplying system was comprised of a base tank, a supply piping, an ink supply tank immediately before an inkjet head, a filter and a piezo-type inkjet head, and the portion from an ink supply tank to an inkjet head was thermally insulated and heated. Inkjet recording was performed by manufacturing to make a nozzle diameter of a head (R µm), a length of a piezoelectric element (L mm) and the ratio thereof (R/L) as shown in Table 1. Further, as shown in Table 2, inkjet recording was also performed by varying a dot diameter, an ejection amount and an ink viscosity while keeping a nozzle diameter, a length of a piezoelectric element and the ratio thereof constant.

Thermal sensors were provided at an ink tank and at the neighborhood of a nozzle of an inkjet head, respectively, and a temperature of a nozzle portion was controlled to be always at a set temperature ±2° C. A piezo-type inkjet head was driven so as to eject multi-sized dots of from 2 to 30 pl at a resolution of 720×720 dpi.

After ink bullet landing, a dot diameter was adjusted by making an UV-A light variable within a irradiation surface illuminance of from 1 to 100 mW/cm$^2$; by being made smaller with increased illuminance and by being made larger with decreased illuminance. An irradiation system, a main scanning speed and an ejection frequency were adjusted so as to start irradiation after ink bullet landing on a recording medium. Herein, dpi referred in the invention represents a dot number per 2.54 cm.

UV light was irradiated at an environmental temperature of 25° C., by utilizing the above-prepared colored ink. Irradiation was performed at a total energy of constantly 300 mJ/cm$^2$ per one color, as energy to cure the ink completely so as to diminish tackiness against finger touch. As a recording medium, a PET film, a transparent biaxially stretched PP film and a soft vinyl chloride sheet, which have been surface treated to be provided with printability, were utilized.

The following evaluations were performed with respect to printed samples.

(Continuous Ejection Stability)

Continuous printing of 100 sheets by an inkjet printer was performed and presence of bleeding of printed characters was observed visually to evaluate continuous ejection stability.

A: No bleeding and an excellent printing property were observed

B: Slight bleeding and distortion of printed Characters were observed

C: Bleeding was observed but characters can be identified

D: Characters cannot be identified due to bleeding (Re-ejection Property)

After printing by an inkjet printer, being kept standing for 6 hours at a printing temperature, printing was performed again to evaluate re-ejection stability based on such as clogging.

A: No clogging and an excellent printing property were observed

B: A few hollows were observed

C: Clogging was observed but printing was possible by a simple recovering operation D: Printing was impossible due to clogging (Image Durability)

The measurement was performed against a solid portion (black) having been printed by an inkjet printer, by use of scratch tester HEIDON-18 (produced by HEIDON Co.) with a measurement needle made of sapphire having 0.8 mm diameter. Measurement was performed by a scratch test of 10 cm with a constant load for tree times, and the limiting load at which no flows reaching to a support was present was set to be a scratch strength, followed by evaluation according to the following three grades.

B: not less than 200 g

C: from 100 g to less than 200 g

D: less than 100 g (Smoothness)

A solid portion (black) was printed by an inkjet printer, and the ink layer thickness was measured after an UV irradiation.

A: A layer thickness was thin, which was satisfactory

B: A layer thickness was somewhat thick but no problems in high precision printing C: A layer thickness was at the lower limit of a usable level D: The thickness was at an unusable level (Printing Quality)

Characters of 8 point size were printed by an inkjet printer, and coarse character images and a shape of one dot of each color were observed under magnification through a lope.

A: No coarse images were observed and a dot shape was a true circle

B: A slight coarse image was observed, however, a dot shape was a true circle

C: Coarse images were observed and a dot shape was somewhat irregular (the lowest acceptable level)

D: Coarse images were observed and a dot shape was also bad.

Each result is shown altogether in Tables 1 and 2.

TABLE 1

| Test No. | *1 | *2 | R/L | Ink | *3 | *4 | *5 | *6 | Ejection stability *7 | 8* | Image durability | Printing quality | Smoothness |
|---|---|---|---|---|---|---|---|---|---|---|---|---|---|
| 1 (Comp.) | 10 | 5 | 2 | 2 | 62 | 8 | 70 | 80 | D | D | B | D | B |
| 2 (Comp.) | 55 | 5 | 11 | 2 | 62 | 8 | 70 | 80 | D | A | B | D | B |
| 3 (Comp.) | 25 | 1.7 | 14.7 | 2 | 62 | 8 | 70 | 80 | D | B | B | D | B |
| 4 (Comp.) | 25 | 6 | 4.2 | 2 | 62 | 8 | 70 | 80 | D | B | B | D | B |
| 5 (Inv.) | 25 | 5 | 5 | 2 | 62 | 8 | 70 | 80 | B | B | B | B | B |
| 6 (Inv.) | 45 | 5 | 9 | 2 | 62 | 8 | 70 | 80 | C | A | B | C | B |
| 7 (Inv.) | 25 | 4 | 6.3 | 2 | 62 | 8 | 70 | 80 | A | B | B | B | B |
| 8 (Inv.) | 30 | 3.5 | 8.6 | 2 | 62 | 8 | 70 | 80 | A | B | B | A | B |
| 9 (Inv.) | 45 | 2 | 22.5 | 2 | 62 | 8 | 70 | 80 | C | A | B | C | B |

*1; Nozzle diameter: R μm
*2; Length of piezo-electric element: L mm
*3; Dot diameter: μm
*4; Ejection amount: pl
*5; Head temp.: ° C.
*6; Viscosity at 30° C. mPa · s
*7; Continuous ejection
*8; Re-ejection

TABLE 2

| Test No. | *1 | *2 | R/L | Ink | *3 | *4 | *5 | *6 | Ejection stability *7 | *8 | *9 | Printing quality | Smoothness |
|---|---|---|---|---|---|---|---|---|---|---|---|---|---|
| 10 (Comp.) | 25 | 4 | 6.25 | 1 | 62 | 8 | 150 | Solid | A | B | D | D | D |
| 11 (Inv.) | 25 | 4 | 6.25 | 3* | 62 | 8 | 70 | 6 | C | C | B | C | B |
| 12 (Comp.) | 25 | 4 | 6.25 | 4 | 62 | 8 | 25 | 20 | D | B | B | D | B |
| 13 (Inv.) | 25 | 4 | 6.25 | 3 | 62 | 8 | 120 | 40 | C | B | B | C | A |
| 14 (Inv.) | 25 | 4 | 6.25 | 3 | 62 | 8 | 100 | 80 | C | B | B | B | A |
| 15 (Inv.) | 25 | 4 | 6.25 | 2 | 62 | 33 | 70 | 80 | C | B | B | C | C |
| 16 (Inv.) | 25 | 4 | 6.25 | 2 | 62 | 17 | 70 | 80 | C | B | B | C | C |
| 17 (Inv.) | 25 | 4 | 6.25 | 2 | 125 | 8 | 70 | 80 | B | B | B | B | B |
| 18 (Inv.) | 25 | 4 | 6.25 | 2 | 43 | 8 | 70 | 80 | B | B | B | C | B |
| 19 (Inv.) | 25 | 4 | 6.25 | 2 | 225 | 15 | 70 | 80 | C | B | B | C | B |
| 20 (Inv.) | 25 | 4 | 6.25 | 2 | 83 | 8 | 70 | 80 | A | B | B | B | B |
| 21 (Inv.) | 25 | 4 | 6.25 | 2 | 62 | 8 | 70 | 80 | A | B | B | A | B |
| 22 (Inv.) | 25 | 4 | 6.25 | 3 | 62 | 8 | 100 | 200 | B | B | B | B | B |
| 23 (Comp.) | 25 | 4 | 6.25 | 3 | 62 | 8 | 150 | 600 | *10 | *10 | *10 | *10 | *10 |

TABLE 2-continued

| Test No. | *1 | *2 | R/L | Ink | *3 | *4 | *5 | *6 | Ejection stability *7 | *8 | *9 | Printing quality | Smoothness |
|---|---|---|---|---|---|---|---|---|---|---|---|---|---|
| 24 (Inv.) | 24 | 3 | 8 | 2 | 60 | 8 | 65 | 80 | A | A | B | A | B |
| 25 (Inv.) | 24 | 3 | 8 | 2 | 90 | 16 | 65 | 80 | A | A | B | A | B |

*1; Nozzle diameter: R μm
*2; Length of piezo-electric element: L mm
*3; Dot diameter: μm
*4; Ejection amount: pl
*5; Head temp.: °C.
*6; Viscosity at 30 °C. mPa·s
*7; Continuous ejection
*8; Re-ejection
*9; Image durability
*10; No ejection
Ink 3*: ink 3 added with organic solvent MEK of 10 weight parts Examples according to the invention are excellent in all aspects including ejection stability, image durability, smoothness and printing quality. Among the examples of the invention, examples with the condition of R/L>7 are especially excellent in the ejecting stability and the printing quality.

EFFECT OF THE INVENTION

According to an inkjet recording method of the invention, there appear no ink head clogging and no bleeding with printed characters, and, further, image stability after printing is excellent. In addition, high precision printing is possible on every kind of a recording material.

What is claimed is:

1. An inkjet recording method comprising a step of ejecting an ink containing at least a photo-polymerizing compound and a colorant from a nozzle of a recording head, which comprises a piezoelectric member, to form an image on a recording member, wherein the inkjet recording method utilizes a piezoelectric function of the piezoelectric member, a diameter of the nozzle (R) is from 20 to 50 μm, and a length of the piezoelectric member in an ink ejecting direction (L) is from 2.0 to 5.0 mm.

2. The inkjet recording method of claim 1, wherein a ratio of the diameter of the nozzle (R) to the length of the piezoelectric member in an inkjet ejecting direction (L) is 5<R/L<20.

3. The inkjet recording method of claim 2, further comprising a step of heating the ink, which is a liquid having a viscosity of from 10 to 500 mPa·s at 30° C., to 40–150° C. by a heating means, before ejecting the ink from the nozzle of the recording head.

4. The inkjet recording method of claim 2, further comprising a step of irradiating ultraviolet rays after forming the image on the recording member.

5. The inkjet recording method of claim 1, wherein a ratio of the diameter of the nozzle (R) to the length of the piezoelectric member in an inkjet ejecting direction (L) is 7<R/L<20.

6. The inkjet recording method of claim 5, further comprising a step of heating the ink, which is a liquid having a viscosity of from 10 to 500 mPa·s at 30° C., to 40–150° C. by a heating means, before ejecting the ink from the nozzle of the recording head.

7. The inkjet recording method of claim 5, further comprising a step of irradiating ultraviolet rays after forming the image on the recording member.

8. The inkjet recording method of claim 1, wherein an ink ejecting amount per 1 dot is from 2 to 20 pl (pico-liter).

9. The inkjet recording method of claim 1, wherein a dot diameter formed on the recording member is from 50 to 200 μm.

10. The inkjet recording method of claim 1, further comprising a step of heating the ink, which is a liquid having a viscosity of from 10 to 500 mPa·s at 30° C., to 40–150° C. by a heating means, before ejecting the ink from the nozzle of the recording head.

11. The inkjet recording method of claim 1, wherein the ink does not substantially contain water or an organic solvent.

12. The inkjet recording method of claim 1, wherein the recording member has no ink-absorbing property.

13. The inkjet recording method of claim 1, wherein the colorant in the ink is a pigment, a mean dispersion particle diameter of the pigment is not more than 200 nm, and an addition amount of the pigment is from 0.5 to 30 weight %.

14. The inkjet recording method of claim 1, further comprising a step of irradiating ultraviolet rays after forming an image on the recording member.

* * * * *